United States Patent [19]

Francis

[11] Patent Number: 4,567,669

[45] Date of Patent: Feb. 4, 1986

[54] BLUE TOP SETTING DEVICE

[76] Inventor: John G. R. Francis, P.O. Box 329, Manning, S.C. 29102

[21] Appl. No.: 608,307

[22] Filed: May 8, 1984

Related U.S. Application Data

[63] Continuation-in-part of Ser. No. 497,996, May 25, 1983, Pat. No. 4,471,532.

[51] Int. Cl.$^4$ .............................................. G01C 5/04
[52] U.S. Cl. ........................................ 33/367; 33/296; 33/295; 33/147 C
[58] Field of Search ................. 33/367, 296, 290, 293, 33/295, 365, 147 C

[56] References Cited

U.S. PATENT DOCUMENTS

| Re. 13,240 | 5/1911 | Gutwein, Jr. | 33/367 |
|---|---|---|---|
| 327,564 | 10/1885 | MacDonald | 33/367 |
| 547,864 | 10/1895 | Sherman | 33/367 |
| 914,945 | 3/1909 | Gutwein, Jr. | 33/367 |
| 1,042,248 | 10/1912 | McGowan | 33/367 |
| 1,463,738 | 7/1923 | Dickinson | 33/367 |
| 1,599,347 | 9/1926 | Purkey | 33/367 |
| 2,614,572 | 10/1952 | Wisney | 137/39 |
| 2,789,364 | 4/1950 | Selleck | 33/367 |
| 3,015,167 | 1/1962 | Chapman | 33/367 |
| 3,849,898 | 11/1974 | Turloff | 33/367 |
| 4,041,613 | 8/1977 | Bishop | 33/367 |
| 4,231,163 | 11/1980 | Turloff | 33/367 |

FOREIGN PATENT DOCUMENTS

| 998620 | 1/1952 | France | 33/367 |
|---|---|---|---|

Primary Examiner—Willis Little
Attorney, Agent, or Firm—Sughrue, Mion, Zinn, Macpeak and Seas

[57] ABSTRACT

A first rod includes a relative elevation scale and a first fluid container vertically adjustable with respect to the relative elevation scale to a position corresponding to a desired elevation relative to the base of the first rod, and a second rod includes a second fluid container of substantially lesser cross sectional area than the first fluid container, a predetermined level of fluid in the second fluid container indicating that the base of the second rod is at a desired elevation relative to the base of the first rod.

16 Claims, 15 Drawing Figures

BLUE TOP SETTING DEVICE

BACKGROUND OF THE INVENTION

This invention is directed to devices used in the setting of grade stobs, commonly called "blue tops". In particular, it is a special purpose adaptation of the grade indicator attachment to my Direct Reading Grade Rod as shown in FIGS. 1A, B, and C, of copending U.S. patent application Ser. No. 497,996 filed May 25, 1983, now Pat. No. 4,471,532, and the present application is a continuation-in-part of said application 497,996.

The normal procedure for setting a blue top would be to first determine the existing spot elevation with the use of a grade rod and sighting telescope, figure the difference between the desired and existing elevations, and then meticulously set the blue top through numerous trial and error readings of the grade rod. My Direct Reading Grade Rod in conjunction with my Grade Indicator Attachment mentioned above eliminated all but one grade rod reading, but required the rod man to continuously hold the grade rod at the spot elevation until the stob had been set with the Grade Indicator Attachment.

Another problem with liquid level indicators as used in my grade indicator attachment, is that the grade variations are twice as great as the amounts indicated, therefore requiring a special scale that is one half that of the actual measurement. Where unskilled workers are utilized, the dependence on reading the scale can cause confusion and slow the process down.

SUMMARY OF THE INVENTION

It is therefore an object of this invention to provide a grade stob setting device which is easier to use and eliminates the above described disadvantages while maintaining a relatively simple and inexpensive construction.

It is a further object of this invention to provide a stob setting device such that a user can work separately from the rod and instrument men.

It is a still further object of this invention to provide a liquid level indicator which more accurately reflects the actual difference in elevation.

It is a still further object of this invention to provide a liquid level indicator which is easier to use with less chance of spilling fluids.

It is a still further object of this invention to provide a grade stob setting device which will easily enable the user to accurately set numerous stobs scattered over a large area to the same elevation.

It is a still further object of this invention to provide a grade stob setting device which has an additional faster means of setting stobs to approximate elevations.

Briefly, these and other objects of this invention are achieved by having two rods, each with a fluid reservoir interconnected by a piece of flexible tubing. One rod has a base which can be affixed to the ground and a scale for setting the relative difference in existing and desired elevations and the other rod can be calibrated to the first rod and is held by the stob setter during the trial and error process of setting the blue top. The fluid reservoir of the second rod has a fluid level indicator with a much smaller diameter than that of the first rod so that the rise and fall of its fluid level comes close to approximating the actual movement of the reservoir housed in the first rod. Both rods have special valves which prevent the spillage of fluid when closed, but which conveniently allow the free flow of fluid from one rod to the other when open.

DETAILED DESCRIPTION OF THE PREFERRED EMBODIMENTS

Figure 1:
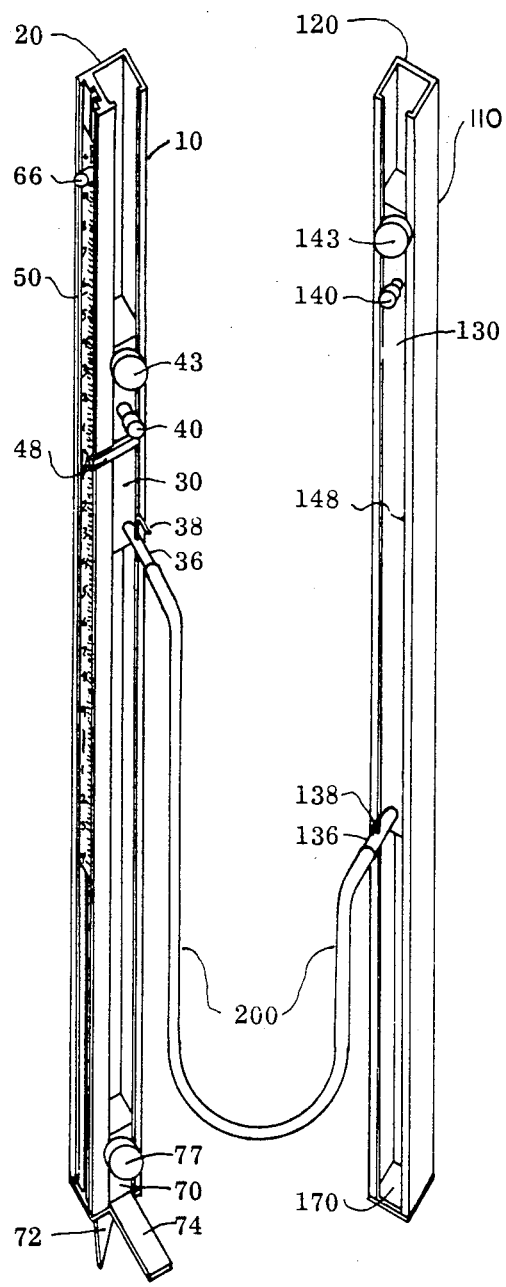
FIG. 1 is a composite isometric view of the assembled device showing the Calibrating Rod 10, its housing 20, Reservoir 30, Scale 50 and Foot 70; the Setting Rod 110, its Housing 120, Reservoir 130 and Base 170; and the Interconnecting Tube 200.

FIG. 1 is a composite view of the Calibrating Rod 10, the Setting Rod 100 and the interconnecting tube 200. The Calibrating Rod 10 is composed of an extruded housing 20; a Calibrating Reservoir 30; a Calibrating Scale 50, and a pointed positioning foot 70.

Figure 2A:
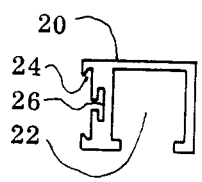
FIGS. 2A and 2B are cross sectional views of the Housings 20 and 120 of the Calibrating Rod and the Setting Rod, respectively.

The Housing 20 (see FIG. 2A) of the Calibrating Rod 10 has a square Slot 22 in which the fluid reservoir 30 and the positioning Foot 70 are inserted, a grooved Slot 24 in which the Calibrating Scale 50 is inserted and a "Tee" Slot 26 in which a Clamping Screw 66 is inserted.

Figure 3A:
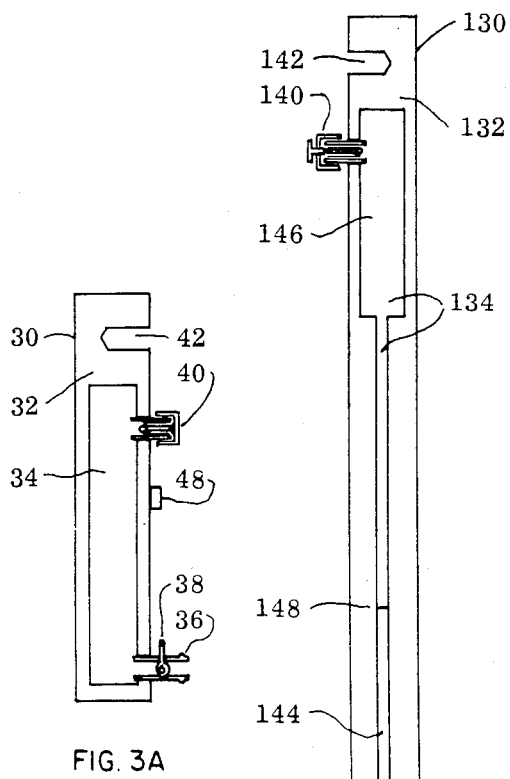
FIGS. 3A and 3B are longitudinal section views of the Reservoirs 30 and 130 for the Calibrating Rod and the Setting Rod, respectively.
Figure 3C:
FIGS. 3C and 3D are top and front views of the pointer which attaches to the Calibration Reservoir 30.
Figure 3D:

The Calibrating Reservoir 30 (see FIG. 3A) is comprised of a square piece of clear plastic rod 32 in which there is a Fluid reservoir 34. At the lower end of the Reservoir 34 there is a Nipple 36 for attaching the Interconnecting Tube 200 and on the nipple there is a Stop Cock 138. At the upper end there is a two position Valve 40. When open, this valve exposes the fluids to the atmosphere and when closed it inhibits the flow of fluid downward and prevents leakage upwards. There is also a threaded Hole 42 for a Thumb Screw 43 for clamping the reservoir 30 to the Housing 20 and a Calibration pointer 48.

Figure 4A:
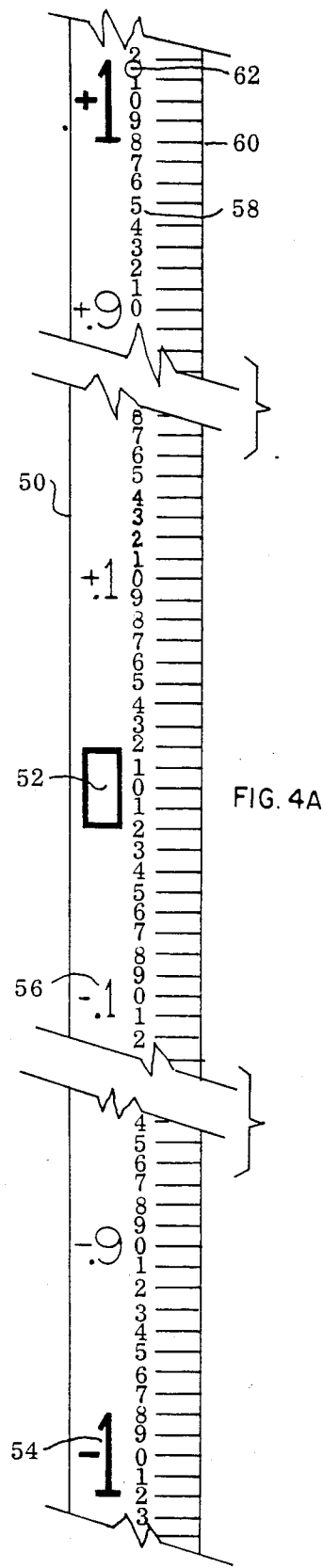
FIG. 4A is a front view of the Calibration Scale 50.
Figures 4B, 4C:
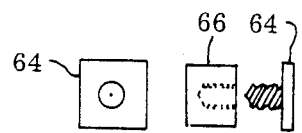
FIG. 4B is a front view of the Clamping Screw 64 and FIG. 4C is a side view of the Clamping Screw 64 and the Knob 64 which together hold the Scale 50 in place.

The Calibrating Scale 50 (see FIGS. 4A and 4C) has a Zero Center 52 with numbers ascending in both directions away from center. The numbers indicate Units 54, Tenths of units 56 and Hundredths of units 58. There are gradation markings 60 in conjunction with the numbers. There is also a clamping Screw 64, the base of which fits into the Tee Slot 26 of the Housing 20 and the threaded portion of which passes through the hole 62 in the Scale 50, and a tapped Knob 66, which together affix the Scale 50 to the Housing 20.

Figures 5A, 5B:
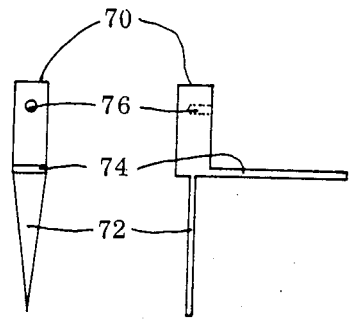
FIGS. 5A and 5B are front and side views of the Foot 70 for the Calibrating Rod 10.

The positioning Foot 70 (see FIGS. 5A and 5B) has a pointed end 72, a Foot Bracket 74 and a threaded Hole 76 for a Thumb Screw 77 which is used to clamp the Foot 70 to the Housing 20 in either a retracted position when not in use or in an extended position when in use.

Figure 2B:
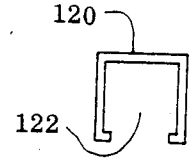

Referring again to FIGS. 1 and 2B, the Setting Rod 110 is comprised of an extruded Housing 120, a Setting Reservoir 130 and a Base Plate 170. The Housing 120 has a square Slot 122 into which the Setting Reservoir 130 and the Base 170 are inserted.

Figure 3B:
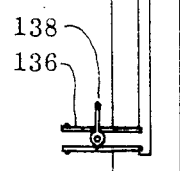

As shown in FIG. 3B, the Setting Reservoir 130 is comprised of a square piece of plastic rod 132 in which there is a fluid Reservoir 134. At the lower end of the reservoir there is a Nipple 136 for attaching the interconnecting Tube 200, and on the nipple there is a Stop Cock 138. At the upper end there is a spring loaded, push button Valve 140. The valve is normally closed, but the valve opens when pushed and the reservoir is exposed to atmospheric pressure. There is also a threaded Hole 142 for a Thumb Screw 143 (FIG. 1) which clamps the Reservoir 130 to its Housing 120. Note that the lower portion 144 of the reservoir 134 is of a much smaller diameter than the upper portion 146 of the reservoir 34 of the other rod. Note also that the lower portion 144 has a scribed setting line 148.

The Interconnecting Tube 200 is a simple piece of clear plastic tubing which enables the two fluid reservoirs to maintain fluid communication with one another.

The device is energized with fluid by filling the Reservoir 34 approximately two thirds full with a colored fluid through the Nipple 36 after opening the valve 40 and the stop cock 38. Once the interconnecting tube is connected to the nipples 36 and 136, both rods are held in an upright position, the valve 40 is opened and the stop cocks 38 and 138 are opened. Now when the valve 140 is depressed, atmospheric pressure and gravity will cause the fluids to flow from Reservoir 34 to Reservoir 134 until the fluid level in each is at the same elevation.

Calibration is achieved by placing the Base 170 of Rod 110 on top of the Foot Bracket 74 of Rod 10. Using the Thumb Screw 43, Reservoir 30 is raised or lowered until the fluid level in Reservoir 130 is even with the Setting Line 148. Fine adjustments can also be made by adjusting the height of Reservoir 130 via Thumb Screw 143. (During either of these operations, valve 40 must be open and valve 140 must be depressed.) The Calibration Scale 50 is now positioned so that its 0 center gradation mark 52 is adjacent to Pointer 48 and the system is now ready for operation.

Operation begins with the positioning of the Calibrating Rod 10. Using the Foot Bracket 74, the pointed end 72 is pressed into the ground adjacent to the location of a spot elevation in such a manner as to affix Rod 10 in a vertical position. Once positioned, the Valve 40 is set in its open position.

A grade rod is then placed on top of the foot bracket 74 and a reading taken to determine how much higher or lower that point is in relation to the desired finish spot elevation. The Calibrating Reservoir 30 is then repositioned so that the pointer 48 is adjacent to the gradation marking which represents the same plus or minus difference in elevation.

Now a fluid level in Setting Rod 110 even with setting line 148 will indicate when the bottom of rod 110 is at the desired elevation and a level above or below will indicate how much the grade stob has to be lowered or raised in setting its top to the desired elevation.

The stob setter can obviously work faster with a sledge hammer in one hand and the setting rod 110 in the other in setting stobs independent of numerous messages relayed by hand signals from the instrument man through the rod man to him. When necessary, he can lay the setting rod down and subsequently get immediate readings without fear of a loss of accuracy.

If desired, the instrument and rod men could be sent out earlier and mark off an entire grading project by writing the elevation differentials on the locating stobs that are normally placed adjacent to the blue top stobs. The differential here would be between the top of the locating stob and the desired spot elevation. The stob setter can subsequently calibrate by placing the setting rod on top of each locating stob in lieu of on top of the foot bracket 74 prior to setting the differential marked on the locating stob. Even when working together, one instrument man and one rod man can keep more than one stob setter busy, thereby greatly increasing the efficiency of the blue topping process.

Some additional design features of the invention will now be described. As mentioned earlier, the cross sectional area of the reservoir 144 is much less than that of reservoir 34. If they had the same cross sectional area, a one foot vertical movement of the Calibrating Reservoir would result in a net fluid movement of only one half a foot in each reservoir. The setting reservoir would therefore have to be moved twice as far as the fluid level indicates before the fluid level returns to the setting mark 148.

In one working example of my invention, the ratio in cross sectional areas was 28.4 to 1 and a similar movement of one foot would result in a corresponding net change in the fluid level of the setting rod of 0.966 feet or an indication error of less than 4 percent.

A further feature concerns the fluid holding capacity of the reservoirs. The total volume of each of the reservoirs 34 or 134, with respect to the total volume of fluid in the system is such that either reservoir is large enough to hold the entire volume of fluid. This has the dual purpose of allowing either reservoir to be emptied into the other for maintenance purposes and to minimize the chance of leakage in the case that either rod is inadvertently laid down with both valves open.

A still further significant feature concerns the restricted fluid movement provided by the valves. The negative and positive relative pressures created by gravity when one reservoir is higher than the other and one or both valves are closed, tends to restrict the flow of fluid. Even in the case of one valve being open, the restriction is such that leakage out of a horizontal rod would occur only after a considerable period of time.

Conversely, the freedom of movement when both valves are open is such that the fluids in the system reach a static level almost immediately. As a consequence of both features, the stob setter is free to lay the setting rod down when he needs both hands to initially place a blue top stob and then immediately obtain readings anytime he presses the valve.

For ease of reading, the length of the two rods and their respective reservoirs is such that the setting line can be placed at the eye level of almost anyone when in the semikneeling position assumed by most stob setters.

In the above described operation of setting grade stobs to varying elevations, a four or five foot length of tubing would be ideal. However, there are numerous cases where many stobs have to be set to the same elevation, for example, the initial grading of the sub slab elevation of a building, or the setting of concrete screeds prior to pouring a building slab.

In the case of a building slab 100 feet by 100 feet, it would be desirable to set over 200 stobs for the proper placement of screed pipe, metal key form construction joints, etc. By placing the Calibration Rod 10 at the center of the building and using a 75 foot long Interconnecting Tube 200, each of the 200 plus stobs could be accurately set after a single calibration. The optional longer tube could be furnished prefilled with fluid and a clamp at each end to facilitate the easy changing of tubes without disturbing the necessary fluid balance between the two rods.

Figure 6A:
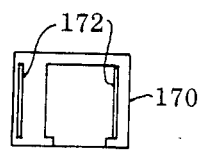
FIGS. 6A, 6B and 6C are top, front and side views of a special purpose base 170 for the Setting Rod 110.
Figures 6B, 6C:
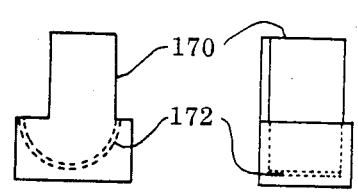

In a further modification, the setting rod 110 could be provided with a rod housing 20 similar to that of the calibrating rod and a slightly modified base 170 (see FIGS. 6A, B and C) which would allow a tape identical to the calibrating tape 50 to be installed in such a manner that the upper end would be in the grooved slot 24 and the other end curved around in the slot 172 within the modified base 170 and extending up into the lower portion of the slot 22.

At the same time, the reservoir 144 would be provided with etched gradation markings to the appropriate scale. Now, for the approximate setting of a grade stob, the setting rod could be placed on the stob to obtain a differential reading via the fluid level and then be placed on the ground beside the stob and the new scale moved until the same differential reading on the scale is even with the top of the stob. The setter can now adjust the stob until its top is at the 0 point on the scale. Fine adjustment could be accomplished by placing the setting rod on top of the stob as the setting line can be more accurately read.

What is claimed is:

1. A device for indicating relative elevation of an object, said device comprising:
    a first rod having a base;
    a first fluid container;
    a second rod having a base;
    a second fluid container secured to said second rod and having a first portion with a relatively small cross-sectional area, and a second portion above said first portion and having a larger cross-sectional area than the cross-sectional area of said first portion;
    means for providing fluid communication between said first and second fluid containers; and
    means for adjustably securing said first fluid container to said first rod at a desired position on said first rod corresponding to a desired elevation of said base of said second rod relative to said base of said first rod, with the fluid level in said second container being at a predetermined level when said base of said second rod is at said desired relative elevation.

2. A device as defined in claim 1, further comprising a first valve for venting said first fluid container and a second valve for venting said second fluid container, said second valve being normally biased toward a closed position in which fluid flow into and out of said second fluid container is restricted.

3. A device as defined in claim 1, wherein said first rod includes retractable support means for supporting said first rod in a substantially vertical position.

4. A device as defined in claim 1, wherein said support means comprises a pointed base member.

5. A device as defined at claim 1, wherein said cross sectional area of said first portion of said second fluid container is substantially less than the cross sectional area of said first fluid container.

6. A device as defined in claim 5, wherein said predetermined level of fluid in said second fluid container is within said first portion of said second fluid container.

7. A device as defined in claim 1, wherein the respective volumes of each of said first and second fluid containers are greater than the total volume of fluid contained in said first and second fluid containers and in said means for providing fluid communication therebetween.

8. A device as defined in claim 1, wherein the position of said scale on said first rod is vertically adjustable with respect to said first rod.

9. A device for indicating relative elevation of an object, said device comprising:
    a first rod having a base;
    a first fluid container;
    a second rod having a base;
    a second fluid container secured to said second rod and in fluid communication with said first rod;
    means for adjustably securing said first fluid container to said first rod at a desired position on said first rod corresponding to a desired elevation of said base of said second rod relative to said base of said first rod, with the fluid level in said second container being at a predetermined level when said base of said second rod is at said desired relative elevation; and
    a scale on said second rod at a lower portion thereof, said scale being adjustable on said second rod for indicating, independently of said fluid level in said second fluid container, the relative elevation between said object and said desired relative elevation when said second rod is placed on the ground adjacent said object.

10. A method of setting an object at a desired elevation using an elevation indicating device, said device including a first rod having a base, a first fluid container, a second rod having a base, a second fluid container secured to said second rod, means for providing fluid communication between said first and second fluid containers, and means for adjustably securing said first fluid container to said first rod at a desired position on said first rod corresponding to a desired elevation of said base of said second rod relative to said base of said first rod, said method comprising the steps of:
    adjusting the relative vertical positions of said first and second fluid containers, with said bases of said first and second rods at a first relative elevation, such that said fluid is at said predetermined level in said second fluid container;
    adjusting the vertical position of said first fluid container on said first rod by an amount and in a direction corresponding to the difference between said first relative elevation and said desired relative elevation; and
    measuring the elevation of said object with said second rod and adjusting the elevation of said object until said fluid at said predetermined level in said second fluid container indicates that said object is at said desired relative elevation.

11. A method as defined in claim 10, wherein said step of adjusting the relative vertical positions of said first and second fluid containers comprises adjusting the position of said first fluid container relative to said first rod.

12. A method as defined in claim 10, wherein said step of adjusting the relative positions of said first and second fluid containers further comprises adjusting the vertical positioning of said second fluid container relative to said second rod.

13. A method as defined in claim 10, wherein said first scale includes a zero position with relative elevation numbers of one sign increasing on one side of said zero position and relative elevation numbers of an opposite sign increasing on the other side of said zero position, said device including indicating means secured to said first fluid container for indicating a desired relative elevation on said scale, said method further comprising the step of adjusting the position of said first scale such that said zero position is adjacent said indicating means after said first adjusting step.

14. A method as defined in claim 10, wherein said second rod includes a vertically adjustable scale, said measuring step comprising the steps of:
   adjusting said scale on said second rod until the scale, when said second rod is placed on the ground adjacent said object, indicates an approximate elevation error between the top of said object and a desired elevation;
   adjusting the elevation of said object in accordance with the error elevation indicated on said scale with said base of said second rod on the ground adjacent said object; and
   thereafter adjusting the elevation of said object, as necessary, until said fluid is at said predetermined level in said second fluid container when said base of said second rod is at the same elevation as said object.

15. A method as defined in claim 14, wherein said object is a grade stob, wherein a locator stob adjacent said grade stob carries an indication of the desired relative elevation between said locator stob and grade stob, said step of adjusting the relative vertical positions of said first and second fluid containers comprising placing the base of said first rod on the ground adjacent said locator stob, placing the base of said second rod on top of said locator stob, and adjusting the relative vertical positions of the first and second fluid containers until the fluid is at said predetermined level in said second fluid container; and wherein said step of adjusting the vertical position of said first fluid container comprises adjusting the vertical position of said first fluid container, with said base of said second rod on top of said locator stob, in accordance with said indication of desired relative elevation carried on said locator stob.

16. A method as defined in claim 10, wherein said first relative elevation comprises said bases of said first and second rods at substantially the same level.

* * * * *